United States Patent [19]

Cole

[11] Patent Number: 5,229,554
[45] Date of Patent: Jul. 20, 1993

[54] DOWNHOLE ELECTRO-HYDRAULIC VERTICAL SHEAR WAVE SEISMIC SOURCE

[75] Inventor: Jack H. Cole, Ponca City, Okla.

[73] Assignee: Conoco Inc., Ponca City, Okla.

[21] Appl. No.: 815,662

[22] Filed: Dec. 31, 1991

[51] Int. Cl.⁵ .............................................. G01V 1/40
[52] U.S. Cl. .................... 181/106; 181/113; 181/121; 367/75; 73/152
[58] Field of Search ............... 181/105, 106, 113, 121; 367/75, 189; 73/152

[56] References Cited

U.S. PATENT DOCUMENTS

| | | | |
|---|---|---|---|
| 4,648,478 | 3/1987 | Dedole et al. | 181/106 |
| 4,702,343 | 10/1987 | Paulsson | 181/106 |
| 4,715,470 | 12/1987 | Paulsson | 181/106 |
| 4,796,723 | 1/1989 | Laurent et al. | 181/102 |
| 4,805,725 | 2/1989 | Paulsson | 181/106 |
| 4,923,030 | 5/1990 | Meynier | 181/106 |
| 4,991,685 | 2/1991 | Airhart | 181/106 |
| 5,031,717 | 7/1991 | Hardee et al. | 181/106 |
| 5,031,719 | 7/1991 | Baria et al. | 181/122 |

Primary Examiner—J. Woodrow Eldred

[57] ABSTRACT

A downhole electro-hydraulic vertical shear wave seismic source places the reaction mass internal to the source cylindrical housing and isolates the actuator from the wellbore fluid and pressure. The clamping system of this source uses two serrated pads radiused to match the inside diameter of the casing. Hydraulic cylinders which are retracted by internal compact stacks of spring washers are used for actuating the serrated pads. A device for keeping the reaction mass in a "floating" position with actuator piston centered within the actuator cylinder is provided by suspending the reaction mass from a compact and soft urethane spring. A threaded guide rod passing vertically through this spring allows spring compression to be adjusted until the actuator piston is precisely centered with no differential hydraulic pressure across the piston.

3 Claims, 6 Drawing Sheets

DOWNHOLE ELECTRO-HYDRAULIC VERTICAL SHEAR WAVE SEISMIC SOURCE

BACKGROUND OF THE INVENTION

1. Field of the Invention

The present invention relates to the generation of seismic waves and more particularly to the generation of seismic shear waves downhole.

2. Related Prior Art

The seismic exploration industry has immediate need for a downhole seismic source capable of generating strong vertical seismic shear waves at frequencies from 10 to 600 Hz. Such a source is not now available. Presently, there are at least three current attempts to develop such sources. All of these sources clamp to the borehole casing and shake the casing vertically with a vibratory sweep.

In one attempt, a development firm has been working on a voice-coil actuated source, which uses a very small internal reaction mass and a very heavy external housing. This apparatus must operate continuously at resonance throughout a vibratory sweep and uses a variable pressure gas volume and a feedback control system to make this resonance possible. It appears that this firm has not developed an effective sidewall clamping mechanism and have not yet tested its sources in a well.

A second development firm, in cooperation with several large corporations, is promoting the development of a pneumatic vibratory source which, like the first source, depends upon continuous resonance for effective operation. So far, the prototype of this concept has operated with a band width that is too limited and an output signal that is too weak for applications which the general industry is considering.

One company has built and extensively tested a prototype source based upon their U.S. Pat. No. 4,702,343, issued on Oct. 27, 1987. The concept in this patent is basically a downhole application of VIBROSEIS. According to released data, this source generates a very strong output signal in the frequency range from 10 to 600 Hz. This concept uses an external reaction mass, which so far has restricted applications to well bores in which no liquids are present. There appears to be plans to further develop the SV version of this source.

Other U.S. patents that are indicative of the state of the art are listed below.

U.S. Pat. No. 4,923,030, titled "Device for Generating Acoustic Waves by Causing a Falling Mass to Strike a Target Element Coupled With the Walls of a Well", issued to Patric Mevnier relates to a device for generating acoustic waves in a well by causing a mass falling inside a body to strike a target element and to transmit impacts to the surrounding geological formations by anchoring the body in the well by retractable shoes. A tractive force exerted on the support cable from the surface, after anchorage of the body, causes a support element to move upwards which takes the target element and the mass with it. When the mass is hydraulically locked in its set position, the cable is slackened so that the target element and the support element can come back to the bottom position. In this position, the support element presses on a pusher element which actuates hydraulic locking and releases the mass.

U.S. Pat. No. 4,648,478, titled "Device for Generating Sound Pulses Inside a Well by Percussion", issued to Pascal Dedole, et al. relates to a device for generating sound pulses in a well by a mobile mass striking against a target element integral with an elongate body anchored in a well by retractable shoes actuated by hydraulic cylinders. The mobile mass which slides in a first chamber in the body is moved away by a piston moving in a second chamber of the body and intermittently locked in the moved away position by a valve. The piston, the valve and also the hydraulic cylinders acting on the anchorage shoes are actuated by a hydraulic system which may be remote controlled from the surface.

U.S. Pat. No. 4,991,685, titled "Downhole Seismic Source", issued to Tom P. Airhart, relates to a downhole seismic generator that can be located in various positions in the well including being located in engagement with the bottom of the well bore. The generator includes a large striker mass driven by compressed gas into engagement with an anvil having one end located in engagement with the medium in which the seismic signals are to be set up. A retractor is provided to return the mass to ready position so that a series of seismic signals can be provided as desire. An optional baffle that is connected to the generator prevents waves from traveling through the well bore which would otherwise diminish or confuse the seismic shock wave initially generated.

U.S. Pat. No. 4,796,723, titled "System for Transmitting Energy Through an Apparatus Usable for Subsoil Prospection Lowered Inside a Well of Drill Hole", issued to Jean Laurent, et al. relates to a system for transmitting energy to an apparatus, such as a pulsed or vibratory seismic source, lowered inside a well or drill hole. It includes a structure anchorable in a well, a mobile device whose linear displacement with respect to the anchorable structure causes the creation of energy and a device for accumulating the energy created, a rigid column connected to the mobile device and a driver disposed outside the well for moving the rigid column linearly. The mobile device and the device for accumulating energy may be formed by a weight and a device for raising this latter or else by a hydraulic system including a linear pump.

U.S. Pat No. 5,031,717, titled "Advanced Downhole Periodic Seismic Generator", issued to Harry C. Hardee, et al., relates to a downhole periodic seismic generator system for transmitting variable frequency, predominantly shear-wave vibration into earth strata surrounding a borehole. The system comprises a unitary housing operably connected to a well head by support and electrical cabling and contains a clamping apparatus for selectively clamping the housing to the wall of the borehole. The system further comprises a variable speed pneumatic oscillator and a self-contained pneumatic reservoir for producing a frequency-swept output over a discrete frequency range.

U.S. Pat. No. 5,031,719, titled "Seismic Sonde", issued to Roy Baria. et al. relates to an instrument for sensing seismic waves and determining their direction of propagation. This instrument is operable a considerable depth in a borehole. It comprises a short, stubby sensor module with a device to clamp it to the borehole wall and includes three accelerometers. The instrument is connected by a flexible umbilical cored to a primary module suspended by a cable. The down hole electronics and the power supply for the clamp are provided in the primary module. The sensor module has a fundamental resonant frequency about 1 kHz, well above the frequency of the seismic waves it is subjected to, so that the signals from the accelerometers accurately represent those waves.

U.S. Pat. No. 4,805,725, and U. S. Pat. No. 4,702,343 both titled "Nondestructive Downhole Seismic Vibrator Source and Processes of Utilizing the Vibrator to Obtain Information About Geologic Formations", issued to Bjorn N.P. Paulsson, relate to a nondestructive downhole seismic source capable of generating Sv-Waves, Sh-Waves, and P-Waves alone or in combination to determine information about a surrounding geologic formation. The patent also includes processes of performing cross well tomography and reverse vertical seismic profiling. The patent also includes a means and process to carry out in hole seismic logging operations.

U.S. Pat. No. 4,715,470, titled "Downhole Electromagnetic Seismic Source", issued to Bjorn N.P. Paulsson, relates to a downhole seismic source capable of generating seismic forces in excess of 1000 newtons. The source produces seismic waves for seismic applications, particularly cross borehole measurements and vertical seismic profiling. Coupled with motion sensing devices, the source also performs as a seismic logging tool. The source is comprised of an outer housing, a device for clamping the source securely to the wellbore, and a linear electromagnetic actuator which utilizes permanent magnetic material having remanent magnetic field exceeding about 0.9 T such as a rare earth permanent magnetic. The source has a diameter of about 12.5 cm to fit within a typical wellbore and the actuator has a length of about 1 meter.

SUMMARY OF THE INVENTION

The concept disclosed in the present invention is an improvement of the prior art concepts in several ways. Prior art concepts are not suited for operation in deep liquid-filled wells because the reaction mass is external. In such a configuration, high pressure in the wellbore will try to force fluid past the rod seals in the actuator and interfere with actuator operation. The design of the present invention places the reaction mass internal to the source cylindrical housing and isolates the actuator from the wellbore fluid and pressure. This will allow the source to operated at depths of 10,000 feet or more.

Sources which shake the casing vertically must clamp firmly to the casing without damaging the casing or destroying the cement bond between the exterior of the casing and the surrounding formation. The clamping system of this source uses two serrated pads radiused to match the inside diameter of the casing. Such clamping has proven to be very effective in locking downhole receivers to the sidewall. Hydraulic cylinders which are retracted by internal compact stacks of spring washers are used for actuating the serrated pads. The source can be made capable of clamping to casings of different inside diameters by simply adding expansion pads to the cylindrical housing of the source.

A device for keeping the reaction mass in a "floating" position with the actuator piston centered within the actuator cylinder is provided by suspending the reaction mass from a compact and soft urethane spring. A threaded guide rod passing vertically through this spring allows spring compression to be adjusted until the actuator piston is precisely centered with no differential hydraulic pressure across the piston.

Other novel features are included in the design of the present invention and are discussed in the detailed description of the preferred embodiment.

DESCRIPTION OF THE PREFERRED EMBODIMENT

The concept disclosed in the present invention is an improvement of the prior art concepts in several ways. Prior art concepts are not suited for operation in deep liquid-filled wells because the reaction mass is external. In such a configuration, high pressure in the wellbore will try to force fluid past the rod seals in the actuator and interfere with actuator operation. The design of the present invention place the reaction mass internal to the source cylindrical housing and isolates the actuator from the wellbore fluid and pressure. This will allow the source to operated at depths of 10,000 feet or more.

Sources which shake the casing vertically must clamp firmly to the casing without damaging the casing or destroying the cement bond between the exterior of the casing and the surrounding formation. The clamping system of this source uses two serrated pads radiused to match the inside diameter of the casing. Such clamping has proven to be very effective in locking the downhole receivers to the sidewall. Hydraulic cylinders which are retracted by internal compact stacks of spring washers are used for actuating the serrated pads. The source can be made capable of clamping to casings of different inside diameters by simply adding expansion pads to the cylindrical housing of the source.

All vertically moving VIBROSEIS type sources must include a means of keeping the reaction mass in a "floating" position with the actuator piston centered within the actuator cylinder. The present invention very effectively provides this function by suspending the reaction mass from a compact and soft urethane spring. A threaded guide rod passing vertically through this spring allows spring compression to be adjusted until the actuator piston is precisely centered with no differential hydraulic pressure across the piston.

Figure 1:
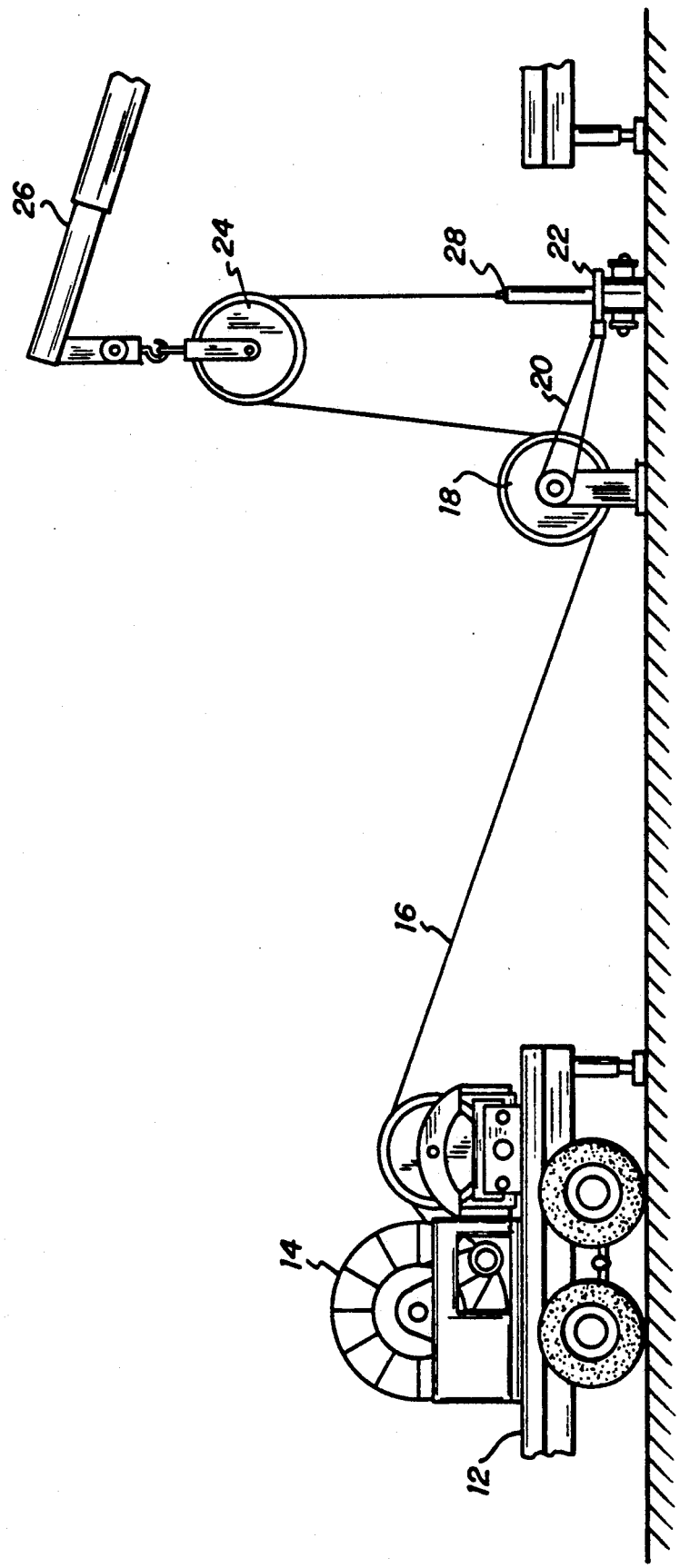
FIG. 1 is a schematic of the large surface draw works with which the present invention may be used.

FIG. 1 is a schematic of a large surface draw works 12. A large reel 14, containing about 4500 feet of armored cable 16 containing both electrical power conductors and signal conducting wires is mounted on the draw works. A large power supply, (not shown), connects to the power conductors through slip rings and provides up to 15 kw to a downhole source. Signals are also transmitted through slip rings between the downhole equipment and recorders, controllers, etc. located on the surface (not shown).

Cable 16 passes under a large diameter nylon sheave 18 attached by a pivoting support apparatus 20 to well head 22. Cable 16 then threads over an upper identical sheave 24, supported from a crane or mast 26, and attaches to the top end of a downhole power package 28, which converts the electrical power to hydraulic power close to a seismic source. Power package 28 may be of any type currently in use in the art.

Figure 2:
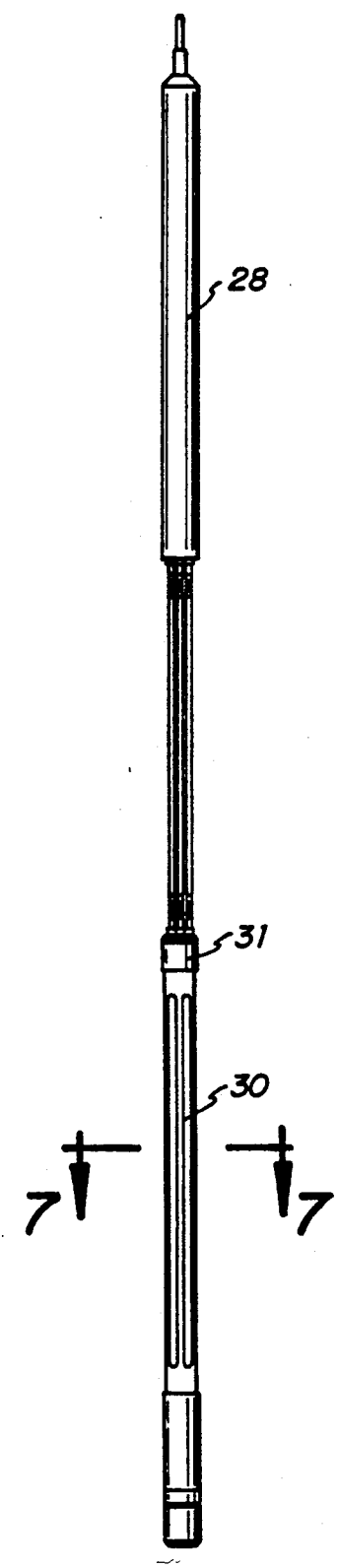
FIG. 2 is a schematic drawing of a shear wave seismic source.
Figure 3:
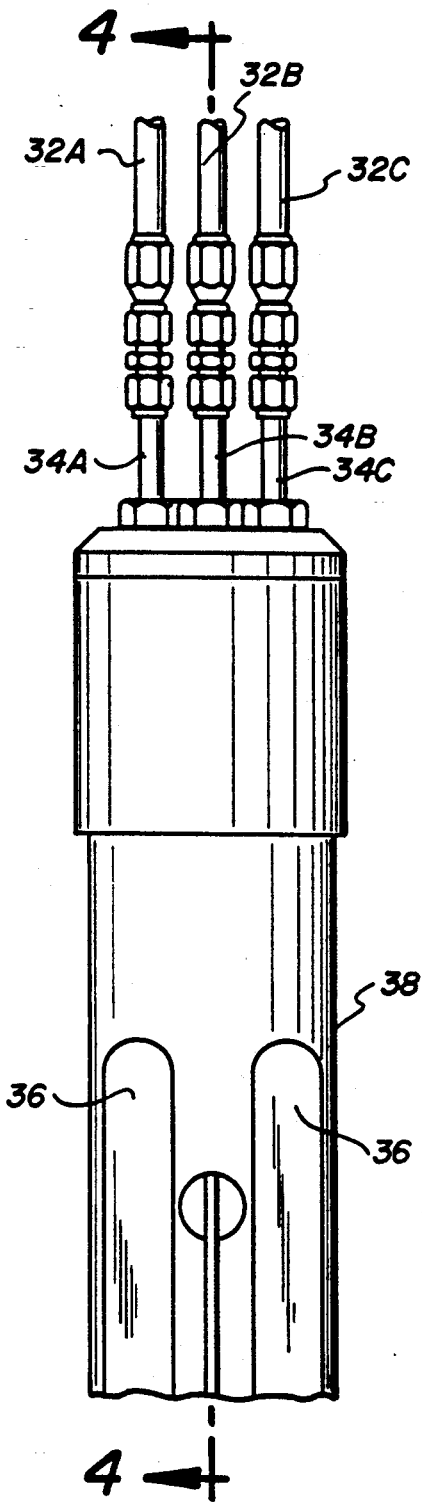
FIG. 3 is a side view of an enlargement of a portion of FIG. 2.
Figure 4:
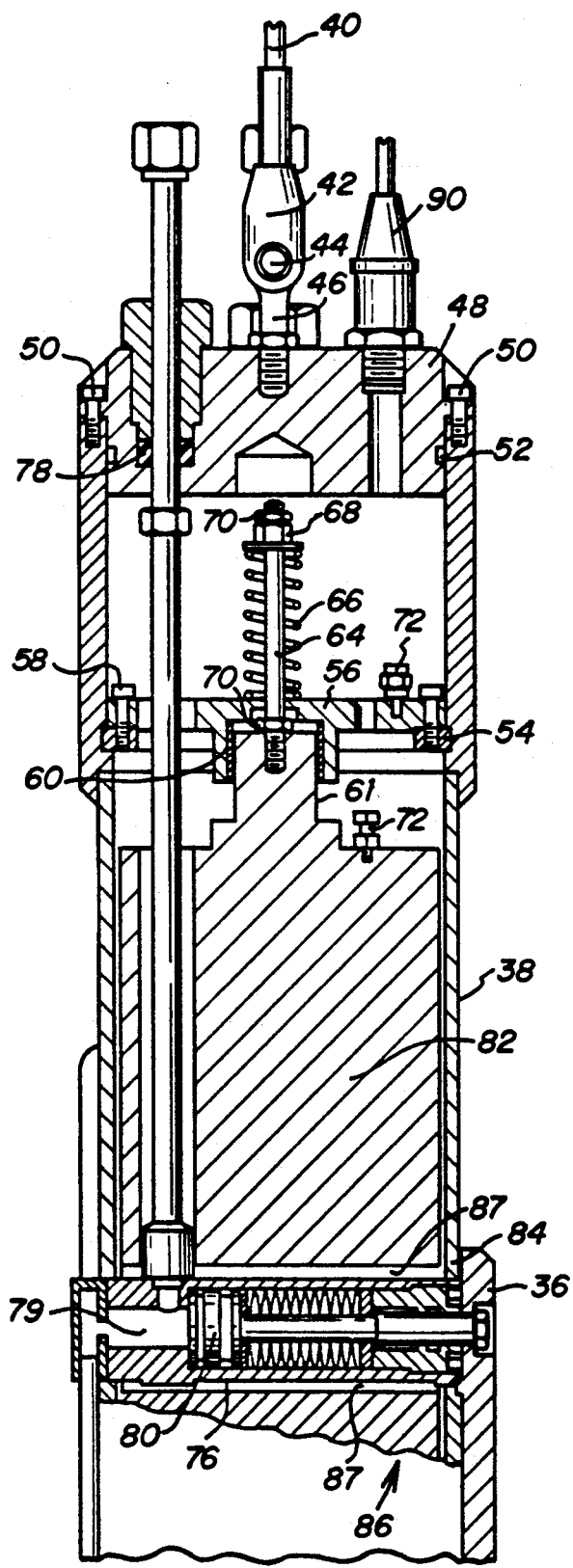
FIG. 4 is a cut out view along lines 4—4 of FIG. 3.

FIG. 2 illustrates a source 30 attached to the lower end of the power package 28. FIG. 3 is an enlargement of the upper end 31 of source 30 and illustrates three hydraulic hoses, 32A, 32B and 32C from power package 28 connected to stainless steel hydraulic tubes 34A, 34B and 34C extending upward from within source 30. Two serrated pads 36, welded to the external cylindrical housing 38 of source 30, are also shown. FIG. 4 illustrates Section 4—4 of FIG. 3 and shows the inner detail of upper end 31 of source 30. A cable strength member 40 with a clevis end 42 swaged thereto attaches to an eye bolt 44 attached by threads and a jam nut 46 to a top end cap 48. The upper end of strength member 40 attaches in a similar manner to the bottom end of power package 28. Top end cap 48 attaches to welded cylindrical housing 38 by a circular array of socket head machine screws 50. An elastomer O-ring 52 and back up rings seals top end cap 48 within housing 38 to prevent wellbore fluid from entering housing 38.

An attach ring 54 is internally welded to the cylindrical housing 38 and acts as a ledge to which an isolation fitting 56 is affixed by a second array of machine screws 58. A linear bearing 60, containing a built in lubricant, is press fitted into the center of isolation fitting 56 and acts to vertically guide a reduced cylindrical upper end 61 of a cylindrical reaction mass 62 contained concentrically within external housing 38 of source 30. A stud 64, threaded on both ends, is screwed into upper end 61 of reaction mass 62 and extends upward through isolation fitting 56. A urethane spring 66 of about 90 durometer fits over stud 64 and is captured by a washer and nut 68. Top nut 68 is tightened until reaction mass 62 is completely suspended by spring 66. Since urethane spring 66 has a small spring constant and reaction mass 62 is large, the natural frequency of the resulting spring-mass system is only about 5 Hz, which is well below the lowest frequency of the operating vibratory source. Jam nuts 70 are used at both ends of stud 64 to help secure the system against vibration.

Two accelerometers 72 are illustrated in FIG. 4. One is attached to reaction mass 62 and the other to isolation fitting 56, which is rigidly attached to the external housing 38. Output signals from accelerometers 72 may be used for sweep correlation functions and for phase and force compensation in the vibratory control system (not shown).

Two hydraulic pressure tubes 32A and 32C are delivery and return lines for providing hydraulic power to electro-hydraulic servovalve 74, located a the bottom of source 30. The third tube 32B, shown in FIG. 3, provides hydraulic actuation pressure to five cylinders 76, (only one illustrated) which act to clamp source 30 to casing 37. Supply tube 32A and return tube 32C extend completely through vertical passageways in reaction mass 62. All three tubes 32A, 32B and 32C pass through sealing glands 78 located in top end cap 48. These glands 78 are held in place by threaded gland retainer fittings. Sealing glands 78 prevent wellbore fluid from leaking into source housing 38. Tube 32B shown in FIG. 4 terminates in the sidewall of top clamp cylinder 76. An SAE O-ring fitting is welded to the bottom end of tube 32B. Hydraulic fluid passes through tube 32B into a fluid chamber 79 inside clamp cylinder 76, which passes through an orifice into an external tube, which delivers fluid to the four clamp cylinders 76 located below to drive pistons 80.

The total reaction mass 62 consists of the cylindrical mass 82 shown in FIG. 4, the main actuator cylinder 83 at the bottom of the source, and an LVDT mounting block 88 just above the main actuator. To locate reaction mass 62 internal to the clamping section of housing 38 requires that cylindrical reaction mass 82 be captured inside welded housing 84 and clamping cylinder assembly 86.

Five transverse holes 87 are bored through cylindrical reaction mass 82 before it is located within external housing 38. These holes allow clamp cylinders 76 to be inserted through holes bored through welded external housing assembly 84, and to be welded to the housing assembly 38. The holes through housing assembly 84, the holes through cylindrical reaction mass 82, and clamp cylinders 76 are thus all aligned when mass 82 is centered vertically within housing assembly 38 and clamp cylinders 76 are welded in place as shown. The holes bored laterally through cylindrical reaction mass 82 are of such sufficiently larger diameter than the outside diameters of clamp cylinders 76 that reaction mass 62 can move vertically with respect to housing assembly 84 without contacting clamp cylinders 76.

Figure 5:
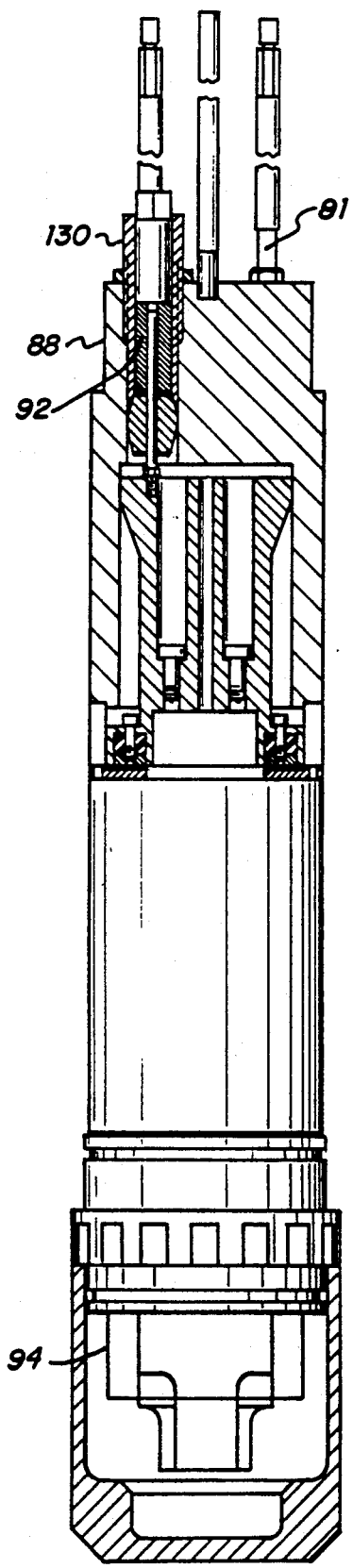
FIG. 5 is a side view of an enlargement of a second portion of FIG. 2.

Referring now to FIG. 5, four threaded tie rods 86 are used to secure cylindrical reaction mass 82 to LVDT mounting block 88. Rods 86 are threaded into mounting block 88 and extend upward through holes in cylindrical reaction mass 82. A hexagonal cross section is formed near the upper end of each of four tie rods 86. These hexagonal sections pass through mating anti-rotation sleeves, which are welded into recesses formed in the upper end of cylindrical reaction mass 82. Nuts, threaded onto the upper ends of four tie rods 86, secure cylindrical reaction mass 82 to tie rods 86 and to LVDT mounting block 88 below. The nuts can be torqued to the correct predetermined value without excessively twisting long tie rods 86. Jam nuts, (not shown), or other suitable means, such as Loctite thread sealant, can be used to prevent loosening of the nuts during vibration. Tie rods 86, passing through cylindrical reaction mass 82, act as preload tension members and assure that cylindrical reaction mass 82 and LVDT mounting block 88 vibrate as a unit.

A final item shown in FIG. 4 is the electrical signal line connector 90, which is a standard high pressure connector of the type commonly used in marine and downhole applications. The signal lines (not shown) connect to two accelerometers 72, to LVDT 92, and to electro-hydraulic servovalve 94 (see FIG. 6). A similar connector attaches to the bottom end of power package 28.

Figure 6:
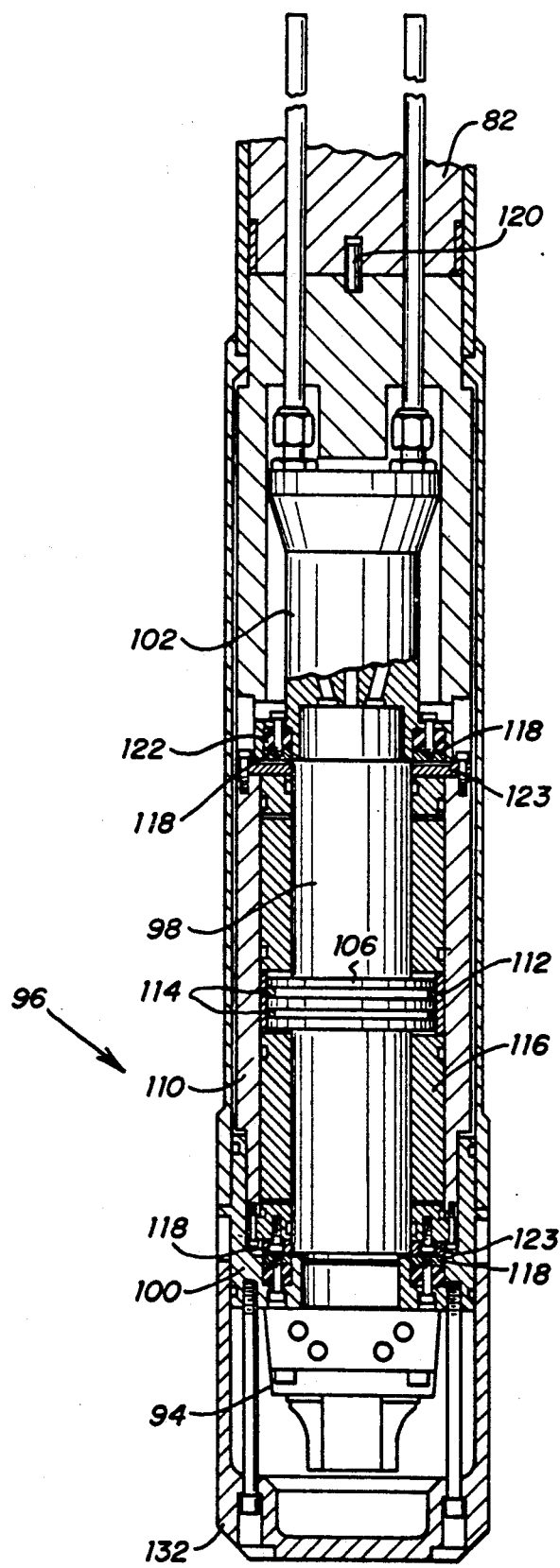
FIG. 6 is a sectional view of FIG. 5.

Detail B of FIG. 2 shown in FIGS. 5 and 6 illustrates servovalve 94, main actuator assembly 96 and LVDT 92 for sensing the displacement of the external housing relative to internal reaction mass 62.

Actuator 96 has servovalve 94 mounted to the end of actuator piston rod 98. A circular valve mounting block 100 is internally threaded to mate with external threads on the bottom end of actuator piston rod 98. Threaded holes in valve mounting block 100 permit valve 94 to be attached by four bolts to block 100, which is screwed onto piston rod 98 and secured with Loctite thread sealant or the like.

Fluid from the hydraulic pressure and return lines flows through passageways formed into a hydraulic tube adapter 102, which is attached by bolts to the upper end of top piston rod 98, and additional holes formed through the length of the complete actuator shaft 104 (consisting of two rods 98 and central piston 106). These holes through actuator shaft 104 terminate in ports at the bottom end of rod 98 and connect to matching ports in servovalve 94. Two parallel holes in actuator shaft 104 extend from control ports in servovalve 94 to outlet ports on either side of the piston.

Referring to FIG. 6, additional details of actuator assembly 96 will now be explained. Actuator assembly 96 consists of several parts. An external cylinder 110 is bored to receive a cast iron piston liner 112, which is pressed into cylinder 110 and then honed. Actuator shaft 109, with piston rings 114 installed in the grooves of central piston 106, is captured within cylinder 110 by two bronze sleeves 116, which are held in place by hardened steel rings 118 at each end of cylinder 110. Machine screws attach rings 118 to the ends of the cylinder 110. Seals are appropriately located between sleeves 116 and cylinder 110 and between each sleeve 116 and cylinder 110 into the return passages through actuator shaft 104.

LVDT mounting block 88 attaches to actuator cylinder 110 by a circular array of machine screws. Thus actuator cylinder 110, bronze sleeves 116, hardened steel end rings 118, LVDT mounting block 88, cylindrical reaction mass 82, and four tie rods 86 all become parts of total internal reaction mass 62. Two alignment pins 120 in the upper end of LVDT mounting block 88 assure proper alignment of cylindrical reaction mass 82 and mounting block 88.

A bumper system is included to prevent piston 106 from banging into the inner ends of bronze sleeves 116 during operation. Circular cavities are formed inside hydraulic tube adapter 102 and valve mounting block 100. Circular elastomer rings 122, rectangular in cross section, fit within these cavities and are held in place by washer like hardened steel (bumper) rings 118. Internal threads are formed in rings 118 to mate with machine screws, which hold rings 118 in place. The other two hardened steel rings 123, one each attached to each end of the actuator cylinder 110, are designed to contact bumper rings 118 just before piston 106 contacts the inner ends of sleeves 116. Bumper rings 118 press against the elastomer rings 122, compressing them slightly and bringing actuator 96 to a stop before piston 106 contacts the ends of bronze sleeves 116. The machine screws threaded into bumper rings 118 travel with bumper rings 118, sliding through holes in valve mounting block 100 and tube adapter 102.

The LVDT position sensing arrangement is self explanatory. Threaded housing assembly 130 allows the signal output to be adjusted to null with actuator shaft 104 located in its central position.

A valve cover 132 protects servovalve 94 from the wellbore environment. A seal prevents wellbore fluid from leaking past valve block 100 into the valve cavity. Two bolts secure cover 132 to valve block 100. Small pipe plugs are installed in the threaded access holes below the bolt heads and sealed to prevent leakage.

Actuator shaft 104, valve mounting block 100, servovalve 94, valve cover 132, hydraulic tube adapter 102, hydraulic tubes 32A, 32B and 32C, external housing assembly 38, clamp cylinders 76, and top end cap 48 are all connected together and move vertically in unison during operations. In conventional VIBROSEIS terms, these components make up the "baseplate", and compose the moving mass which must be driven to shake the casing vertically. To maximize the output, it is desirable to make these components as light possible. With this in mind, hydraulic tube adapter 102, valve cover 132, top end cap 48, and isolation fitting are made of aluminum and the housing assembly is designed to be as light as practical.

Figure 7:
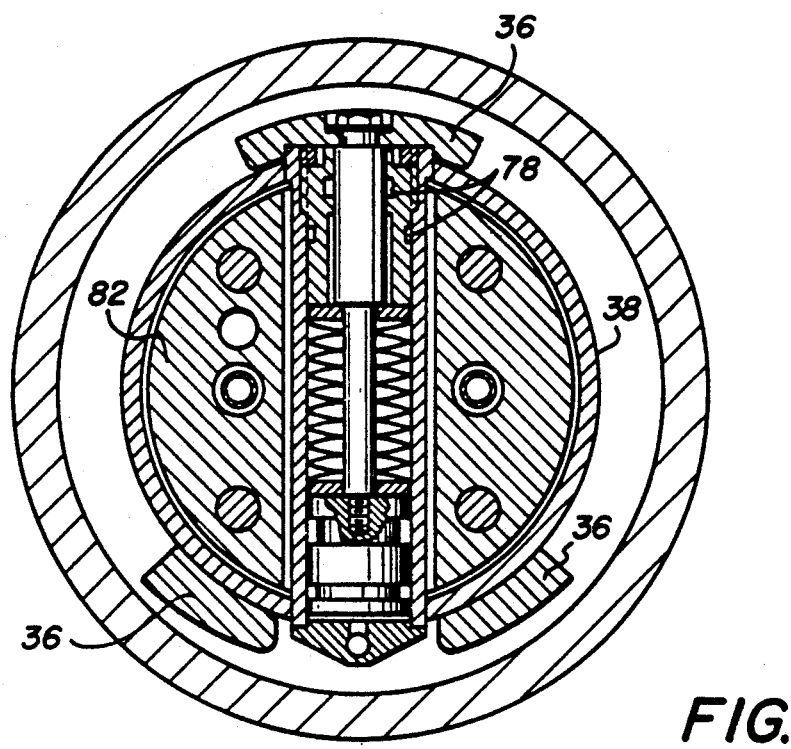
FIG. 7 is a top sectional view of a clamping arrangement for the tool of FIG. 2 in an unenergized position.
Figure 8:
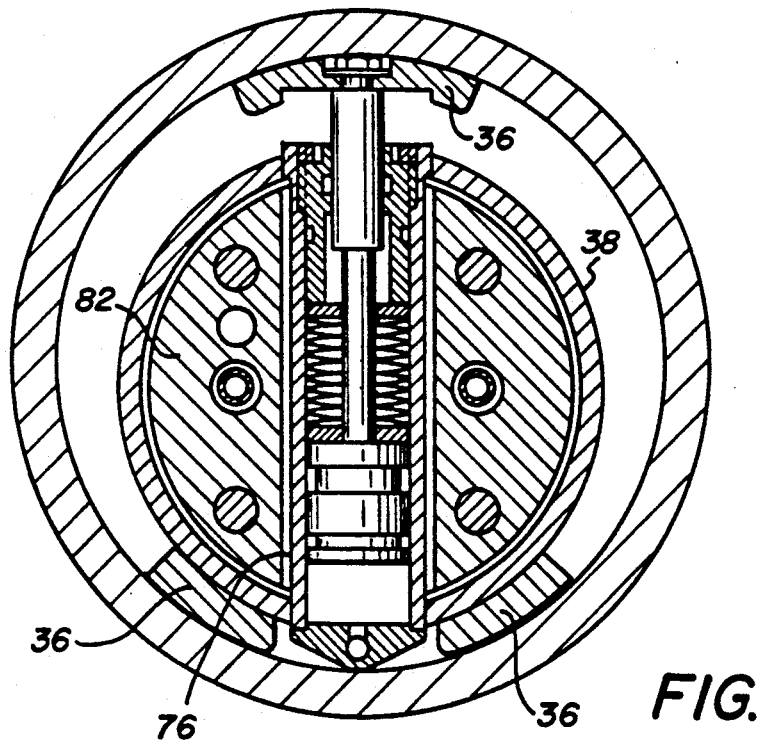
FIG. 8 is a top sectional view of a clamping arrangement for the tool of FIG. 2 in an energized position.
Figure 9:
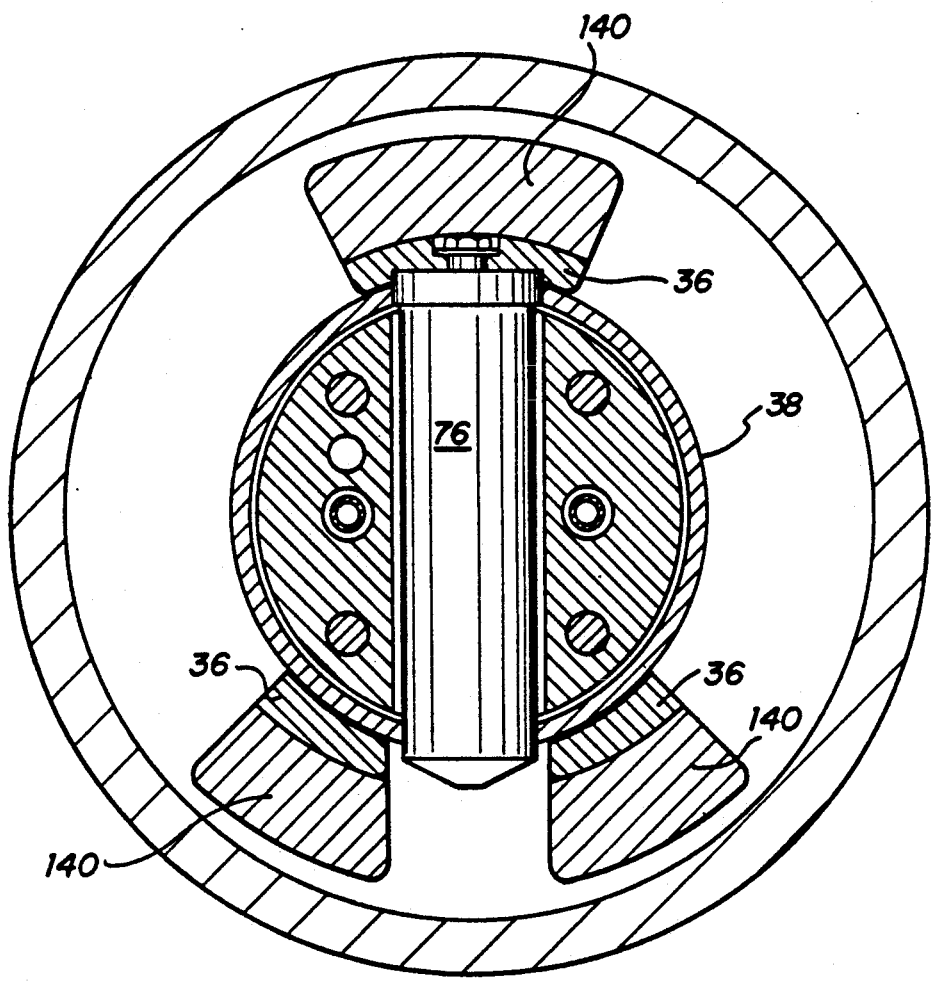
FIG. 9 is a top sectional view of an alternate clamping arrangement for the tool of FIG. 2 in an unenergized position.

FIG. 7 illustrates a cross section of the clamping actuators. The drawing is quite detailed and therefore self explanatory. The system is initially designed to work inside a 6 inch schedule 80 pipe, as indicated by FIGS. 7 and 8. However, the source can be easily modified to operate inside larger diameter pipes or casing as illustrated in FIG. 9, where pad extensions 140 are added to fit an 8-inch schedule 80 pipe. The entire apparatus can, of course, be scaled down to fit and operate inside smaller pipes or casings.

In summary, an advance design of downhole electro-hydraulic vibratory vertical seismic shear wave source has been described. This concept is considered to overcome operational limitations of the sources in prior art and can be used in deep liquid-filled wells. In addition to overcoming the major limitation of prior art, the present invention contains a number of novel design features intended to enhance the source's operational performance.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A downhole electro-hydraulic vertical shear wave seismic source to be lowered into a wellbore comprising:

a source cylindrical housing;

a reaction mass means for generating seismic shear waves, said reaction mass means having an actuator with an actuator piston and actuator cylinder and located internal to said source cylindrical housing to isolate said actuator from wellbore fluid and pressure, said reaction mass including transversely formed holes through which hydraulic cylinders connected to contact pads pass, said holes having a significantly larger diameter than said hydraulic cylinders;

a clamping means to clamp said source cylindrical housing to the wellbore, said clamping means including two serrated pads radiused to match an inside diameter of casing located in said wellbore and hydraulic cylinders having internal compact stacks of spring washers for retraction for actuating said serrated pads;

a compact and soft urethane spring for suspending said reaction mass; and a threaded guide rod passing vertically through said urethane spring to allow spring compression to be adjusted until said actuator piston is precisely centered with no differential hydraulic pressure across said actuator piston.

2. A method for generating seismic shear waves in a wellbore comprising:

providing a source cylindrical housing;

generating seismic shear waves using a reaction mass having an actuator with an actuator piston and actuator cylinder all located within said source cylindrical housing to isolate said actuator from wellbore fluid and pressure;

clamping said source cylindrical housing to the wellbore, said clamping step including matching an inside diameter of casing located in said wellbore with two serrated pads radiused, and actuating said serrated pads with hydraulic cylinders having internal compact stacks of spring washers for retraction;

forming transverse holes in said reaction mass through which hydraulic cylinders having contact pads on one end pass, said holes having a significantly larger diameter than said hydraulic cylinders;

suspending said reaction mass from a compact and soft urethane spring;

centering said reaction mass with a threaded guide rod passing vertically through said urethane spring to allow spring compression to be adjusted until said actuator piston is precisely centered with no differential hydraulic pressure across said actuator piston; and energizing said reaction mass with said cylindrical housing to generate seismic shear waves.

3. A downhole electro-hydraulic vertical shear wave seismic source to be lowered into a wellbore comprising:

a source cylindrical housing;

a reaction mass means for generating seismic shear waves, said reaction mass means having an actuator with an actuator piston and actuator cylinder and located internal to said source cylindrical housing to isolate said actuator from wellbore fluid and pressure;

a clamping means to clamp said source cylindrical housing to the wellbore, said clamping means including two serrated pads radiused to match an inside diameter of casing located in said wellbore and hydraulic cylinders having internal compact stacks of spring washers for retraction for actuating said serrated pads; and suspension means for keeping said reaction mass in a "floating" position vertically within said cylindrical housing, said suspension means including a compact and soft urethane spring for suspending said reaction mass and a threaded guide rod passing vertically through said urethane spring to allow spring compression to be adjusted until said actuator piston is precisely centered with no differential hydraulic pressure across said actuator piston.

* * * * *